No. 865,921. PATENTED SEPT. 10, 1907.
C. A. LINDSTRÖM.
SAFETY CLUTCH FOR CAR DOOR OPERATING MECHANISMS.
APPLICATION FILED JAN. 11, 1907.
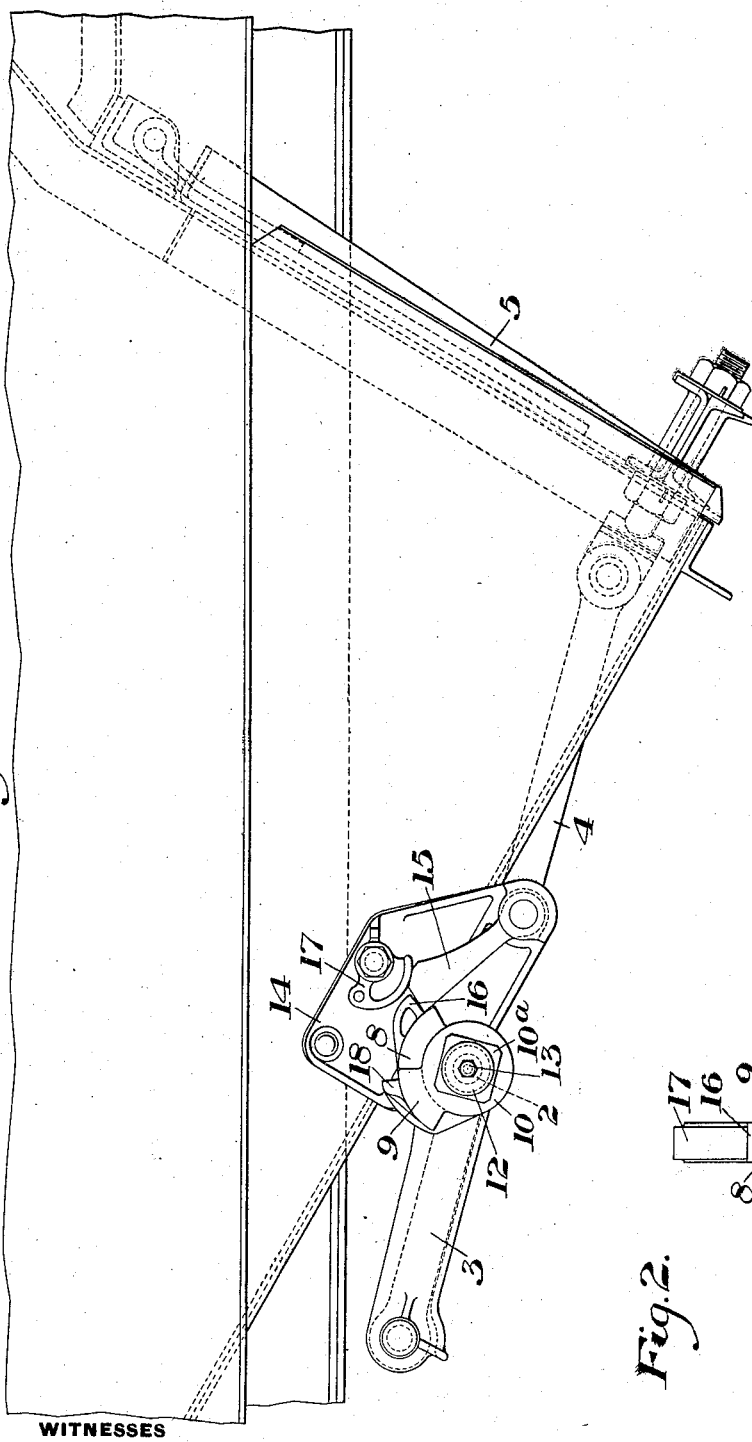
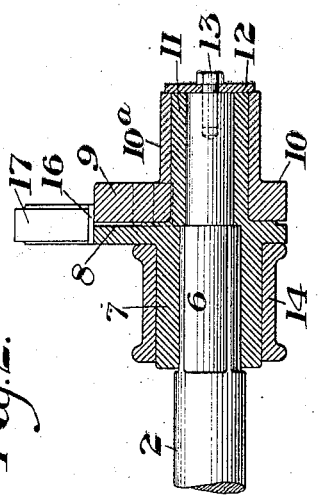

UNITED STATES PATENT OFFICE.

CHARLES A. LINDSTRÖM, OF ALLEGHENY, PENNSYLVANIA.

SAFETY-CLUTCH FOR CAR-DOOR-OPERATING MECHANISMS.

No. 865,921.  Specification of Letters Patent.  Patented Sept. 10, 1907.

Original application filed June 15, 1906, Serial No. 321,794. Divided and this application filed January 11, 1907. Serial No. 351,819.

*To all whom it may concern:*

Be it known that I, CHARLES A. LINDSTRÖM, of Allegheny, Allegheny county, Pennsylvania, have invented a new and useful Safety-Clutch for Car-Door-Operating Mechanism, of which the following is a full, clear, and exact description, reference being had to the accompanying drawings, forming part of this specification, in which—

Figure 1 is a side elevation of a portion of a hopper car embodying my invention; and Fig. 2 is a detail sectional view showing the clutch.

This application is a division of my application Serial No. 321,794, filed June 15th, 1906.

The invention has relation to a safety device or clutch for use in connection with freight car drop-door operating mechanism; and has for its object the provision of a simple and effective device of this character which is arranged to operate to permit the door-operating shaft to be released to open the doors, after which such shaft is free to move without effect upon the wrench, thereby obviating all danger of injury by reason of the wrench being thrown by the sudden opening of the doors.

My invention is applicable to various forms of drop-door operating mechanism, one of which will now be described.

In the drawings, the numeral 2 designates the door-operating shaft, which is connected in any suitable manner to the crank arm 3 having an operating connection 4 with the hinged drop door 5. This shaft is provided with a squared or angular portion 6 upon which is fixed a clutch member 7 having a radially projecting clutch lug 8, which is adapted to engage with a similar lug 9 of a loose clutch member 10, which is journaled on an extension 11 of the clutch member 7. The loose clutch member 10 is prevented from endwise movement of the extension 11 by means of the cup plate 12 secured to the shaft 2 by the screw 13. The clutch member 7 is journaled in the bracket 14, which is secured to the car.

15 designates the usual safety pawl, which is arranged to engage a lug or tooth 16 on the clutch member 7 to insure the locking of the door in closed position. This locking is, however, mainly effected by the crank 3 coming to and below the center line of the shaft 2 when the door is closed, as shown in Fig. 1.

17 is the usual safety dog, which prevents the pawl from working out of engagement with the tooth 16 when in closed position.

The clutch member 7 may be provided with one or more additional teeth 18 to assist in closing the door, these teeth permitting the operator to change the position of the wrench which is applied to the external squared sleeve 10ª, of the clutch member 10.

To open the door, the parts being in the position shown in Fig. 1, the wrench is applied to the squared sleeve 10ª and the clutch member 10 is turned in an anti-clockwise direction until the lug 9 is brought into engagement with the lug 8, and the latter is moved a sufficient distance to release the load on the pawl 15. The pawl is then thrown out of engagement, and the clutch member 10 is turned in the opposite direction until its lug 9 engages the opposite side of the lug 8, and the shaft 2 is turned sufficiently to carry the crank arm 3 beyond the center line of the shaft 2. The load acting on the door now opens the latter and causes a partial revolution of the crank arm 3, and the shaft 2, without turning the clutch member 10, the lug 8 moving away from the lug 9 without moving the clutch member 10. No matter, therefore, how quickly the load may act upon the door after it has been released, there is no danger to the operator, who can remove his wrench at leisure.

I do not limit myself to the exact construction and arrangement shown, since various changes may be made in the details without departing from the spirit and scope of my invention.

What I claim is:—

1. In car door operating mechanism, a door operating shaft, a clutch member removably carried by said shaft to turn therewith, and a coöperating clutch member in loose relation to the shaft and journaled upon the fixed member, the coöperating clutch member being arranged to engage the fixed member in both directions of movement with an intervening lost motion; substantially as described.

2. In car door operating mechanism, a door operating shaft, a clutch member fixed to said shaft and having a sleeve extension, and a coöperating clutch member loosely journaled on said extension, said loosely journaled clutch member being arranged to engage the fixed member in both directions of movement with an intervening lost motion; substantially as described.

3. In car door operating mechanism, a door operating shaft, a clutch member fixed to said shaft, a bracket in which said clutch member is journaled, and a loose clutch member journaled on an extension of the fixed clutch member, the loose clutch member being arranged to engage the fixed member in both directions of movement with an intervening lost motion; substantially as described.

In testimony whereof, I have hereunto set my hand.

CHARLES A. LINDSTRÖM.

Witnesses:
K. L. ROBINSON,
H. B. FISHER.